(12) United States Patent
Hammill

(10) Patent No.: US 7,686,727 B2
(45) Date of Patent: Mar. 30, 2010

(54) LUBRICATION SYSTEM FOR HIGH SPEED PLANET GEARS

(75) Inventor: Robert J. Hammill, Greenwood, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 142 days.

(21) Appl. No.: 10/299,292

(22) Filed: Nov. 19, 2002

(65) Prior Publication Data

US 2004/0094364 A1    May 20, 2004

(51) Int. Cl.
F16H 57/04    (2006.01)
(52) U.S. Cl. .......................... 475/159; 184/6.12; 184/70
(58) Field of Classification Search ................ 184/6.12, 184/70; 475/159; 384/462, 473, 606
See application file for complete search history.

(56) References Cited

U.S. PATENT DOCUMENTS

| 4,480,492 | A | * | 11/1984 | Fujioka et al. | ................. 74/467 |
|---|---|---|---|---|---|
| 4,756,212 | A | * | 7/1988 | Fuehrer | ........................ 475/159 |
| 4,776,237 | A | * | 10/1988 | Premiski et al. | ............. 475/159 |
| 4,968,157 | A | * | 11/1990 | Chiba | .......................... 384/462 |
| 5,302,160 | A | * | 4/1994 | Fujioka | ....................... 475/348 |
| 5,368,528 | A | * | 11/1994 | Farrell | .......................... 475/348 |
| 5,910,063 | A | * | 6/1999 | Kato | ........................... 475/159 |
| 6,929,578 | B1 | * | 8/2005 | Rowell | ........................ 475/331 |

\* cited by examiner

*Primary Examiner*—David M Fenstermacher
(74) *Attorney, Agent, or Firm*—Ingrassia Fisher & Lorenz, P.C.

(57) ABSTRACT

A lubrication system is provided for a planetary gear train. The system includes an oil supply that disperses oil to a thrust bearing. The thrust bearing purges the oil radially outward. A strategically placed molded cavity collects and channels the oil from the thrust bearing into the planet bearings. Features in a planet gear carrier and a planet gear face washer can form the oil flow path. The washer can have a further feature for expelling the oil after the planet bearings are lubricated. By using the planet gear end face washer, this arrangement allows for the cavity to be cast rather than machined to thereby reduce the cost of increasing the flow of oil into the planet bearings.

19 Claims, 7 Drawing Sheets

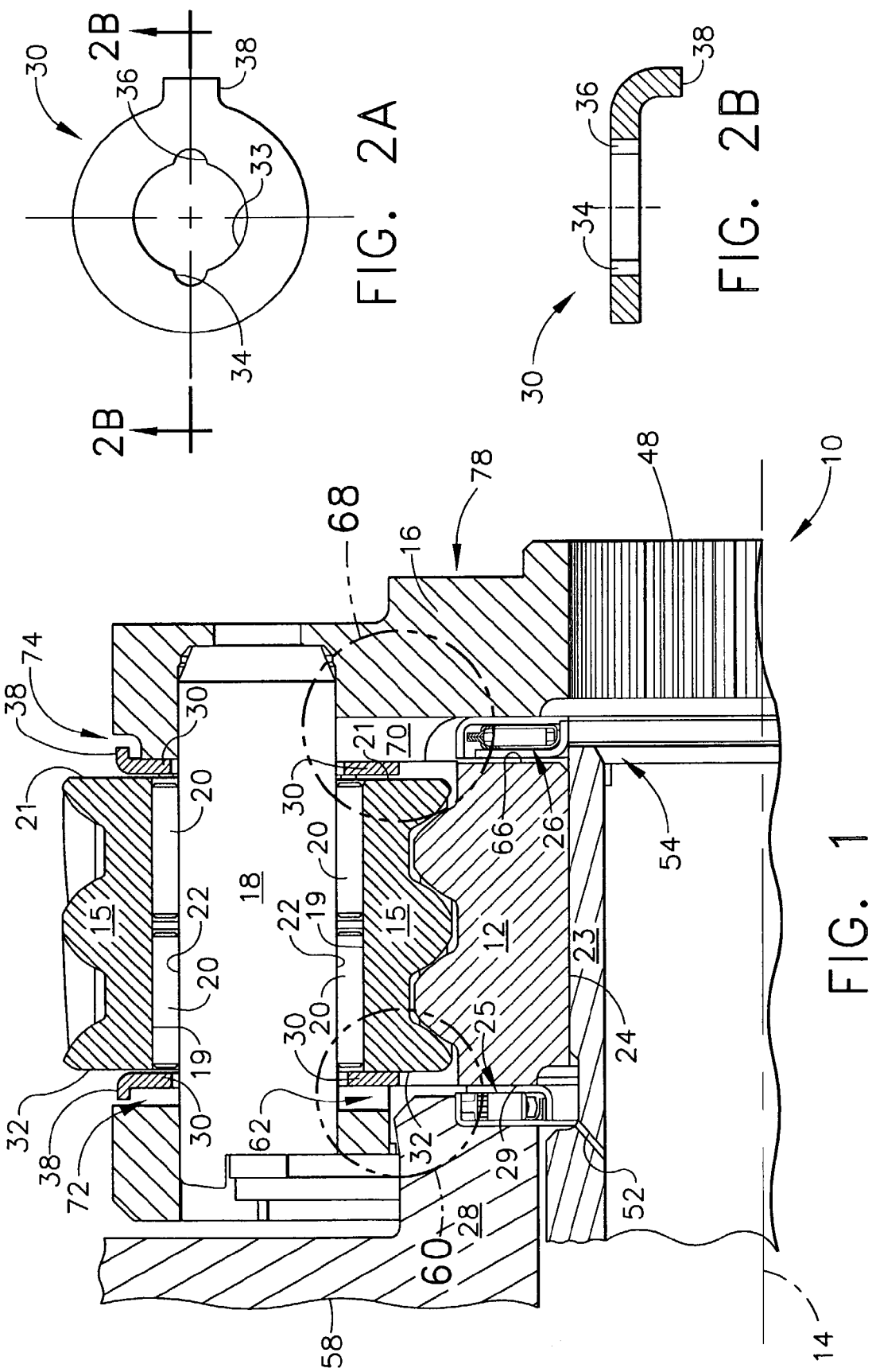

SECTION A-A

SECTION B-B

SECTION A-A

SECTION B-B

SECTION A-A

SECTION B-B

US 7,686,727 B2

LUBRICATION SYSTEM FOR HIGH SPEED PLANET GEARS

TECHNICAL FIELD

The present invention generally relates to planetary gear trains, and more particularly to a lubrication system utilizing molded oil capturing and channeling features.

BACKGROUND OF THE INVENTION

Planetary gear trains are supplied with a lubricant such as oil to reduce friction as well as provide protection from wear of components that come into relative contact such as gear teeth and bearing surfaces. Additionally, the lubricant is an acceptable medium to remove heat from such components. Increasing the cooling by increasing the volume of oil through a bearing increases the maximum speed of the bearing.

In most planetary gear train applications, the planetary gears have the highest rotational speed. Due to this fact, it is most critical to adequately lubricate the rolling elements or planetary bearings to allow the planetary gears to rotate freely. In applications where the planet rotational speed is relatively low, a passive manner of lubricating the planet bearings is adequate. However, when either the relative speed or the load is high, some designs employ a forced lubrication scheme and inject lubricant into the planetary bearings under pressure. Still others employ a combination of the two foregoing techniques by employing channels that collect the oil and then distribute the oil to the planetary gear system by using the centrifugal force on oil leaving a rotating component. Some such prior art designs utilize features to collect and/or distribute the oil that are machined into a carrier for the planet gears.

Any feature that can be cast and not require machining reduces both material and machine time cost. In view of the foregoing, it should be appreciated that it is desirable to provide a lubrication system for collecting and distributing lubricant for planetary gears that utilizes molded oil collection and molded oil channeling or distributing features. This permits a lower system cost than if either or both of these features required machining.

Increasing the amount of lubrication to the planet bearings also enables a reduction in size and weight of the planetary gear set. Furthermore, additional desirable features will become apparent to one skilled in the art from the foregoing background of the invention and the following detailed description of the preferred exemplary embodiments and the appended claims.

SUMMARY OF THE INVENTION

A planetary gear train has a plurality of planet gears rotatably mounted in a carrier. The planet gears mesh with a sun gear. Thrust bearings enable the rotation of the sun gear. Planet gear bearings are positioned between each planet gear and its associated journal pin to enable the rotation of the planet gear around the journal pin.

In accordance with the teachings of the present invention, a lubrication system is provided for the planetary gear train which includes an oil supply that disperses oil to the thrust bearings. Each thrust bearing purges the oil radially outward. Strategically placed molded cavities collect and channel the oil from the thrust bearings to the planet bearings. Features in the planet gear carrier and planet gear face washers can form these cavities. By using the planet gear face washers, this arrangement allows for the cavities in the carrier to be cast features, thereby reducing the cost of increasing the flow of oil into the planet bearings.

BRIEF DESCRIPTION OF THE DRAWINGS

The present invention will hereinafter be described in conjunction with the appended drawing figures, wherein like reference numbers denote like elements.

FIG. 1 is a cross-sectional view of one-quarter of a planetary gear train without the ring gear.

FIGS. 2A and B are detail drawings of the washer used at planet gear end faces.

DESCRIPTION OF THE PREFERRED EMBODIMENT

Figure 3:
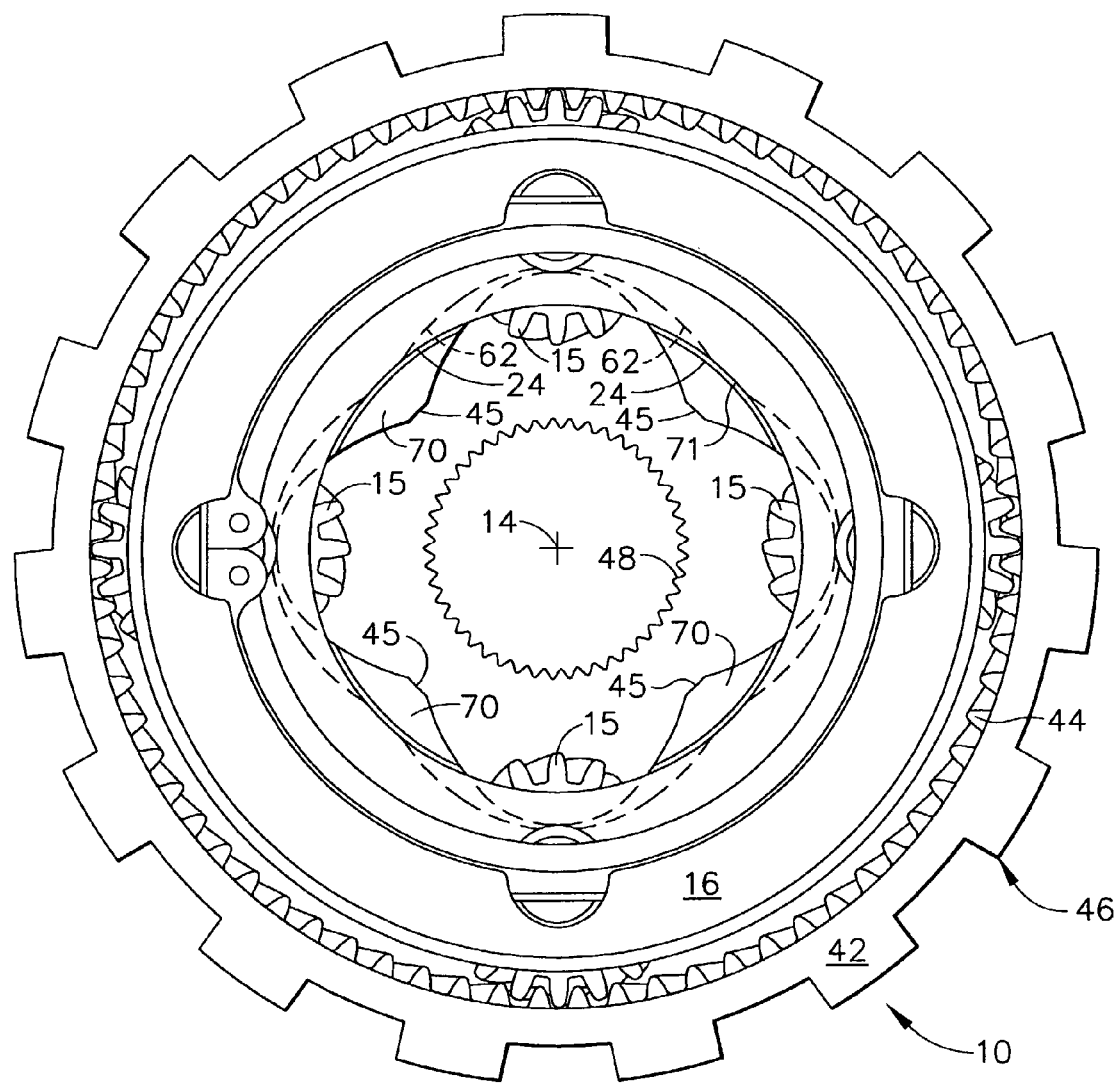
FIG. 3 is a frontal view of the planetary gear train with the sun gear and the end housing removed but including the ring gear.

The following detailed description of preferred exemplary embodiments of an apparatus of the invention is not intended to limit the scope of the invention.

FIG. 1 is a cross-sectional view of one-quarter of an epicyclical planetary gear train 10 with the ring gear removed to promote easier understanding of the structure depicted by the drawing. Helical planetary gear train 10 is typical of prior art gear trains only in the manner of transmitting mechanical power through the gears. More specifically, gear train 10 includes central sun gear 12 that rotates about longitudinal central axis 14. Sun gear 12 meshes with four planet gears 15, one of which is shown in FIG. 1. Each planet gear 15 is mounted in planet carrier 16 by means of a journal pin 18 in a manner such that each planet gear 15 is driven by sun gear 12 to rotate independent from any other planet gear 15 in a known manner. Each planet gear 15 rotates about the associated journal pin 18 with minimal friction due to a full complement bearing set that employs cylindrical roller bearings 20 that contact both the inner diameter 19 of planet gear 15 and the outer diameter 22 of journal pin 18. Sun gear 12 is capable of operation in the range from 0 to 12,000 revolutions per minute in either direction. Thus, gear train 10 is suitable for high-speed applications.

Input shaft 23 is connected to sun gear 12 by splines such as spline 24 or any other suitable connection method. Shaft 23 is driven by a source (not shown) such as an alternating current (AC) induction electric motor. Shaft 23 rotates sun gear 12 in either a clockwise or a counterclockwise direction manner about central axis 14. The rotation of the sun gear drives each planet gear 15 that rotates about each journal pin 18. Sun gear 12 is contained axially by thrust bearings 25 and 26. Bearings 25 and 26 serve as friction reducing devices for the axial thrust loading upon sun gear 12 due to the action of meshing helical gears 12 and 15. End housing 28 supports thrust bearing 25 at sun gear end face 29. Planet carrier 16 supports the other thrust bearing 26.

FIG. 2A is a detailed drawing of washer 30 that encircles pin 18 and abuts planet gear end faces 21 and 32. Washer 30 includes outer circle 31 and inner circle 33. Washer 30 includes oil inlet feature or scallop 34 and an oil outlet scallop 36 into circle 33 and anti-rotation tang 38 extending from outer circle 31. Outlet scallop 36 is 180° from inlet scallop 34. FIG. 2B is a section A-A of FIG. 2A showing that scallops 34 and 36 extend through washer 30 and that tang 38 bends to be at a 90 degree angle with respect to the other portion of washer 30.

FIG. 3 is a frontal view of entire planetary gear train 10 with the sun gear and end housing removed to promote clarity of what is shown. Ring gear 42 includes teeth 44 extending around the inner surface thereof which mesh with planet gears 15. Ring gear 42 is mechanically grounded through the use of splines 46 to a non-rotating gear train housing (not shown) so that the ring gear is stationary with respect to central axis 14. With the ring gear 42 stationary, planet gears 15 therefore orbit about central axis 14 causing the planet carrier 16 to also rotate about central axis 14 in the same direction or same sense. Carrier 16 is the output component of gear train 10 and carrier 16 transmits its motion to some other component through the use of some suitable mechanical connection such as output splines 48. Reference number 45 designates the carrier thrust bearing pilot.

A lubrication system for high-speed planetary gear system 10 facilitates lubrication and cooling of planet gear bearings 20. Planet gears 15 tend to rotate at higher speed than any of the other components of gear train 10 and thus are most in need of lubrication and cooling. More particularly, a fresh supply of oil from a source (not shown) originates in the center of hollow input shaft 23 as shown in FIG. 1. Oil exits input shaft 23 through cross-drilled radial channel 52 and end 54 of shaft 23. A single or multiple channel(s) 52 can be utilized based upon lubrication volume requirements. Oil is propagated through channel 52 and end 54 by the centrifugal forces generated by the rotation of the input shaft 23. This oil is directed toward and passes through axial thrust bearings 25 and 26. As the oil leaves thrust bearings 25 and 26, it continues outward with 360° of radial velocity due to the centrifugal force imparted upon the oil from the rotation of bearings 25 and 26.

Figure 4:
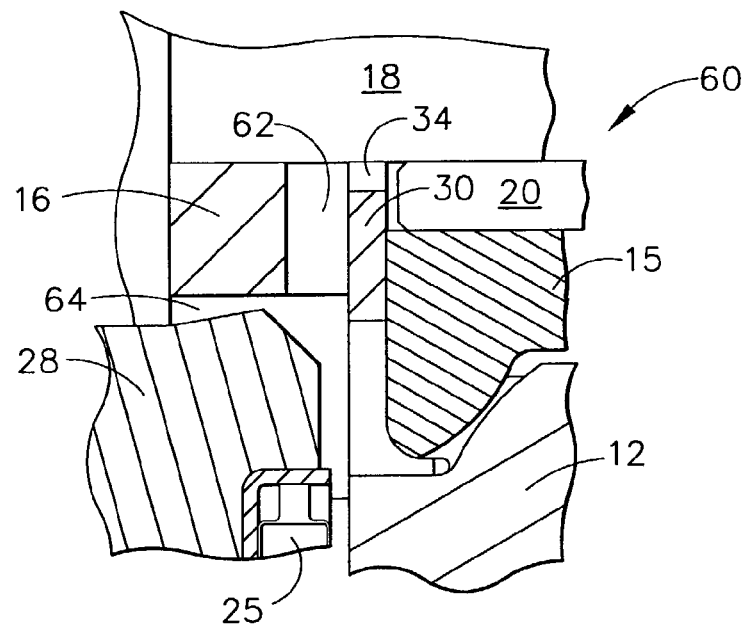
FIG. 4 is an enlarged view of a molded oil collection cavity on one side of the structure of FIG. 1.
Figure 5:
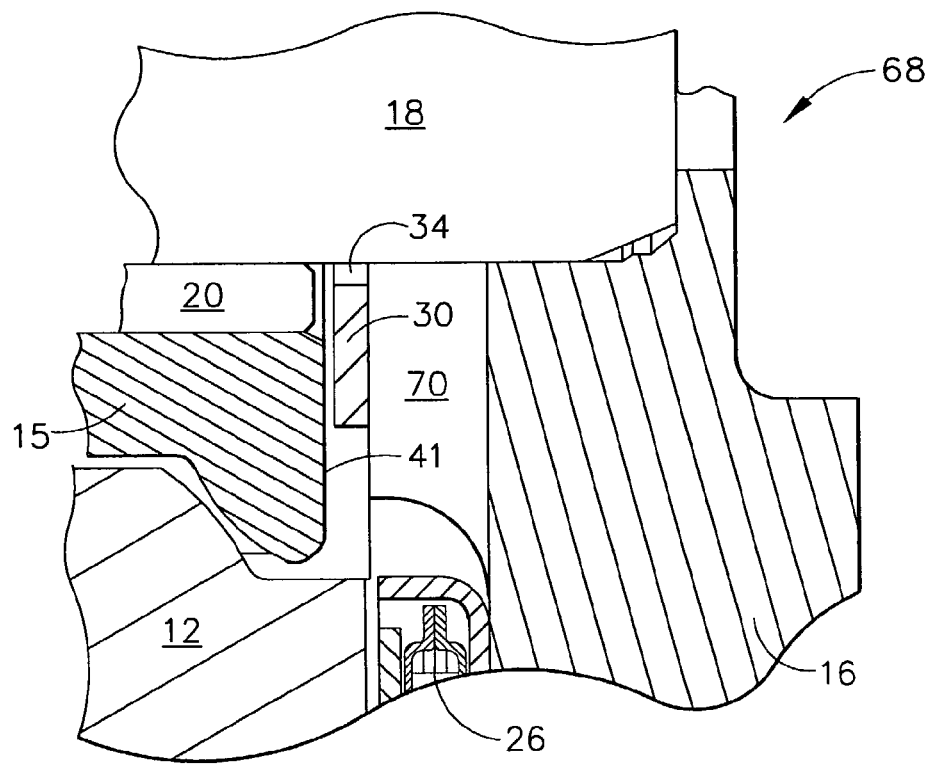
FIG. 5 is an enlarged view of a molded oil collection cavity on another side of the structure of FIG. 1.

FIG. 4 shows a magnified view of "housing side" flange 58 included in circle 60 of FIG. 1 which includes a portion of housing 28. A majority of the oil from thrust bearing 25 is collected by cavity 62 at each planet gear. Cavity 62 is created by cast features in planet carrier 16 and the assembly including planet gear 15 and end face washer 30. Referring to FIG. 5, the other or "carrier side" flange 78 of planetary gear train 10 includes output spline 48. Oil from thrust bearing 26 is contained between sun gear end face 66 and planet gear end face 21. FIG. 5 shows a magnified view of the structure included in circle 68 of FIG. 1. Oil from bearing 26 is collected by cavity 70 which is surrounded by cast features in planet carrier 16 and assembly of planet gear 15 end face washer 30. The volume of the oil collected by cavity 70 can be approximately equal to the volume of the oil collected by cavity 62.

Additionally, cavities 62 and 70 capture oil that is ingested into the mesh between sun gear 12 and the planet gears 15. The hand of helix of sun gear 12 can be either right or left and the rotation thereof can be either clockwise or counterclockwise. Also, the direction of the torque can be either from sun gear 12 to the planet gears 15 or from the planet gears 15 to the sun gear 12. The hand of sun gear 12, the sense of its rotation and the direction of the torque determine whether the side of gear train 10 having end plate 28 or the side having carrier 16 collects the oil.

At each end face of planet gear 15, the collected oil is then funneled into its respective planetary bearing 20 by centrifugal forces and the funnel contour of the cast cavities. This oil enters the planet bearing at the point where washers 30 are located by journal pin 18. Washers 30 each have an inlet scallop 34 strategically placed at its inner diameter where the cast carrier feature will funnel the oil. This reduces the restriction created by the otherwise close fitting design of washers 30 with journal pin 18 if washers 30 did not include inlet scallop 34. The oil then is passed through and lubricates and cools planet bearing rollers 20.

At end 58 of planetary gear train 10, the oil is expelled from planet bearing 20 by means of outlet scallop 36 on the inner diameter of washer 30 and cast feature 72 of FIG. 1 residing on the outboard side of the planet carrier. Feature 72 also engages tang 38 of washer 30 to hold washer 30 stationary. A similar feature 74 on the other side 78 of the planet gear locks washer 30 into place and is not designed to be a primary source for expelling the lubricant from the planet bearing 20. Outlet scallop 36 on washer 30 at planet end 21 is blocked by the design of locking cavity 74. As a result, oil from cavity 70 tends to flow over the surface 22 of journal pin 18 toward exit 72 to lubricate and cool roller bearings 20 and pin 18. The positions of cast features 72 and 74 could be interchanged but it is important that only one of cavities 72 and 74 allow oil flow to force lubrication of all of bearings 20.

Figure 6:
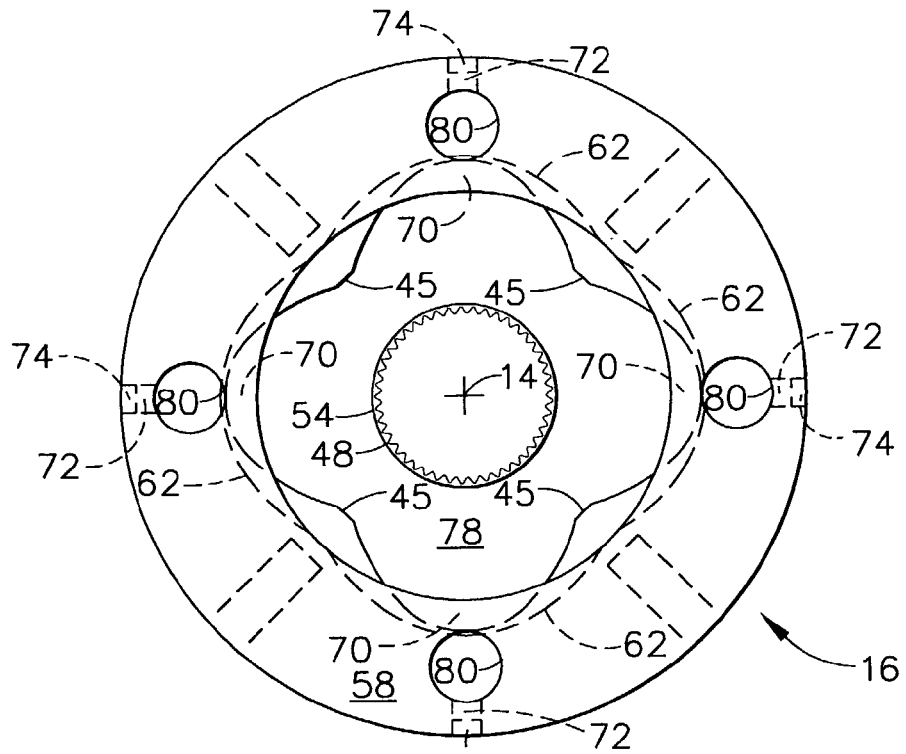
FIG. 6 is a front view of the carrier for the planetary gear train.

FIG. 6 is a front view of sides 58 and 78 of carrier 16. This view shows the relationship of spline 48 and scalloped oil exit 54 from the end of input shaft 23 to central axis 14. FIG. 6 also shows the relationships of carrier side inlet cavities 70, oil exits 72, washer locking cavities 74 and holes 80 for engaging pins 18.

Figure 7:
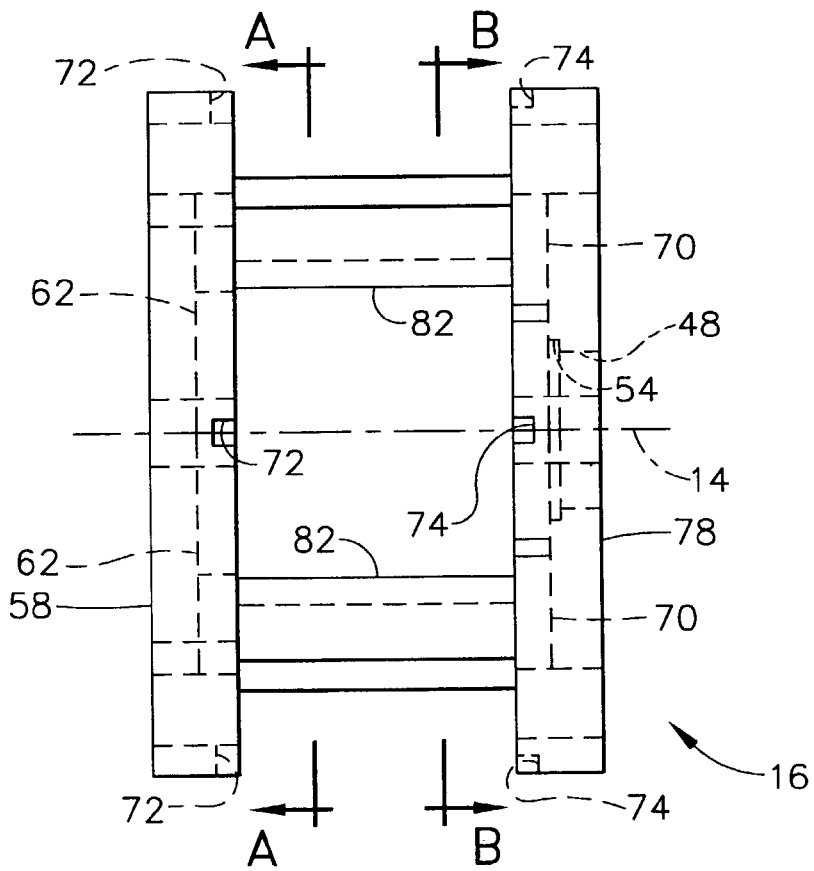
FIG. 7 is a side view of the carrier of FIG. 6.

FIG. 7 shows a side view of planet carrier 16. FIG. 7 includes Section lines A-A and B-B. Cross members 82 hold carrier 16 together so that non-rotating pins 18 can be maintained in alignment for instance. Dashed lines show many of the previously described features on FIG. 7.

Figure 8:
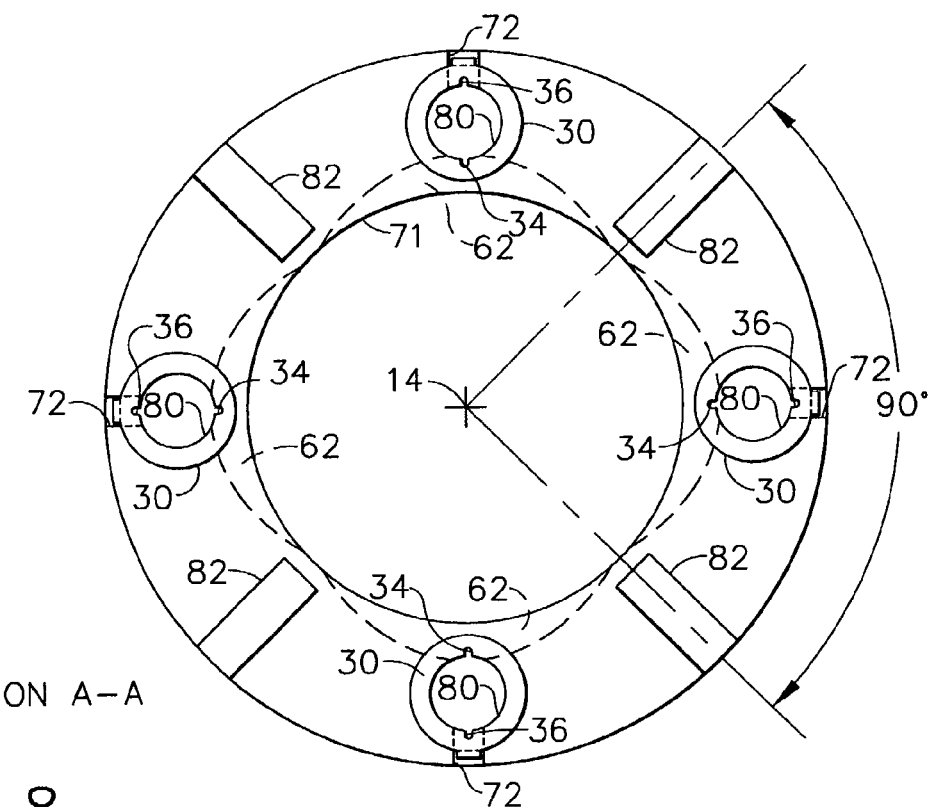
FIG. 8 is a Section A-A of FIG. 7 showing the placement of washers on the housing flange of the carrier.

FIG. 8 shows Section A-A of FIG. 7, which depicts the relationships of central axis 14, housing side oil inlets 62, oil exit cavities 72, holes 80 and cross member 82. Oil inlets 62 are bio-concave or crescent shaped. As planet carrier 16 rotates, each strategically shaped cast cavity 62 collects 90° of the oil that is not lost through the clearance 64 between housing 28 and planet carrier 16 for each respective planet gear 15. The angle of oil collected is equal to 360 degrees divided by the number of planets. Thus, 360 degrees of oil is collected regardless of the number of planets. FIG. 8 shows Section A-A with washers 30 included. Inlets 62 funnel the oil toward strategically placed cavities 72 which extend under scallop 36 of washer 30 to surface 20 of journal pin 18 so that the oil exits through 72 and is collected by a housing (not shown). The oil is then directed to a sump by the housing in a known manner. The oil is then returned by a pump through shaft 23 in a known manner. Sun gear 12, planets 15 and spline 48 as indicated in FIG. 3 determine the diameter of circle 71.

Figure 9:
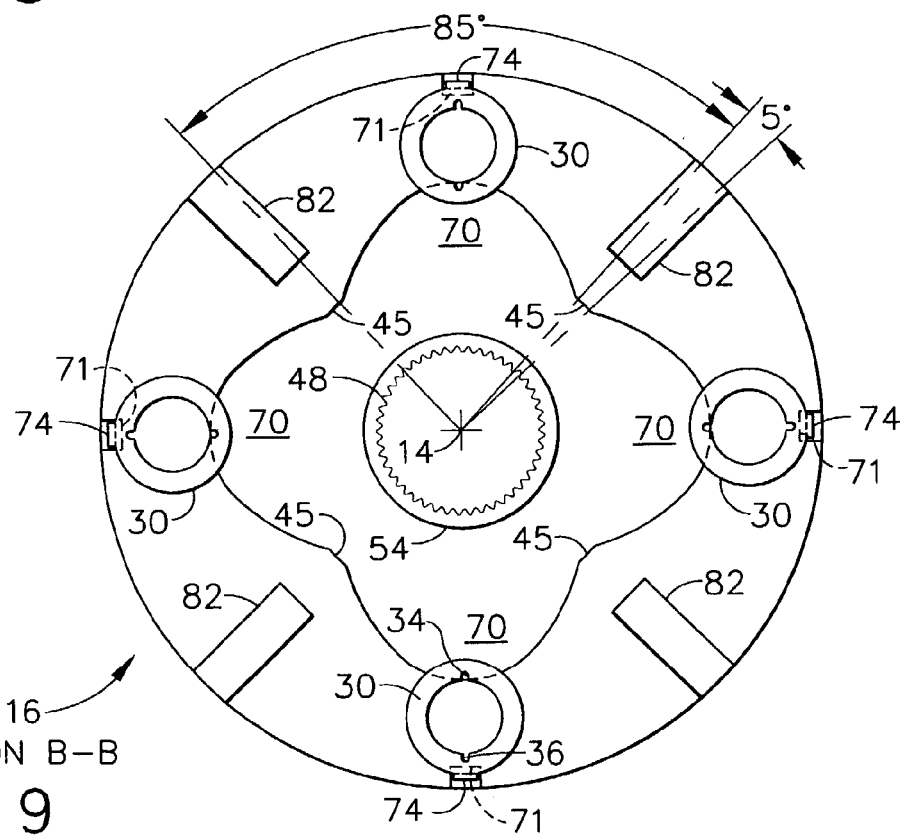
FIG. 9 is a Section B-B of FIG. 7 showing the placement of washers on the carrier flange of the carrier.

FIG. 9 shows Section B-B of FIG. 6, which depicts the relationships of central axis 14 to pilots 45, output spline 48, carrier side inlet cavities 70, washer locking cavities 74 and cross members 82. The arrangement and substantially semi-circular cavities 70, in addition to the rotation of planet carrier 16, is such that for each one of four planet gears 15, cavities 70 capture approximately 85° of the radial flow of oil from thrust bearings 26. The other 5° are used as piloting feature 45 of axial thrust bearing 26 between sun gear 12 and planet carrier 16. FIG. 9 shows washers 30. Features 71 indicate oil-blocking portions of features 74.

Figure 10:
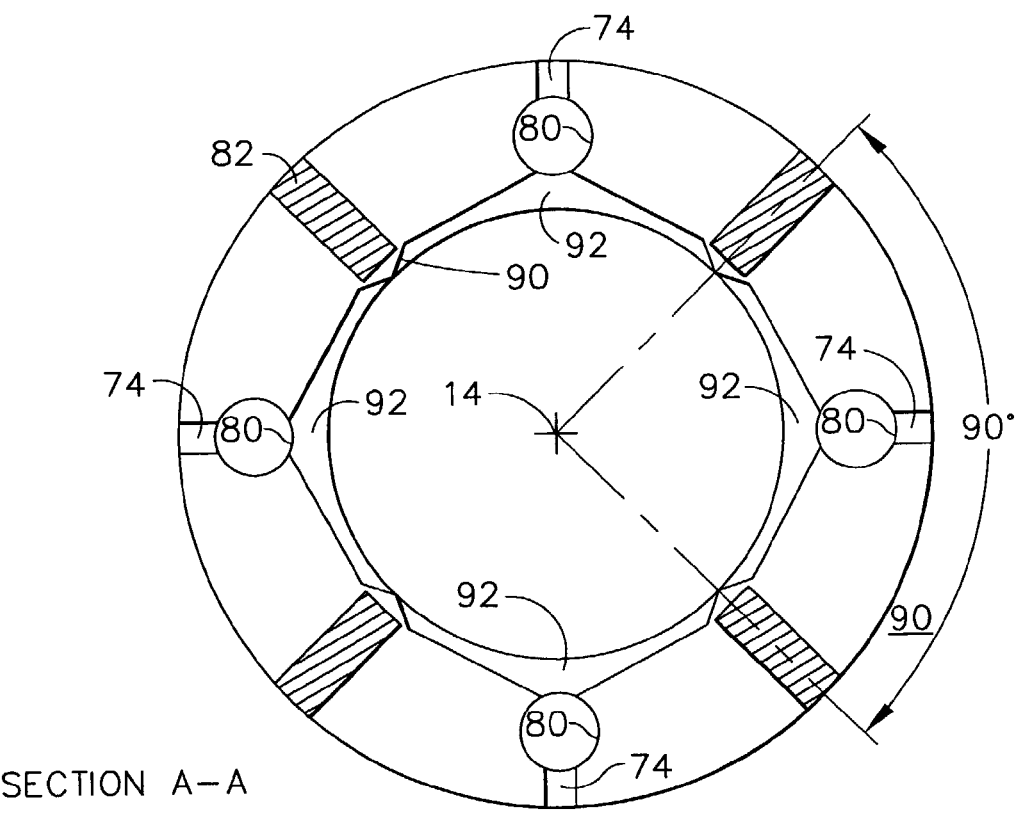
FIG. 10 is a Section A-A of FIG. 7 having a housing flange oil inlet cavity of an alternative shape.

FIG. 10 is a Section A-A of FIG. 7 having a housing side inlet cavity of an alternative substantially triangular shape 92 which is formed by straight edges straight lines forming a funnel toward holes rather than the curved edges of 62.

Figure 11:
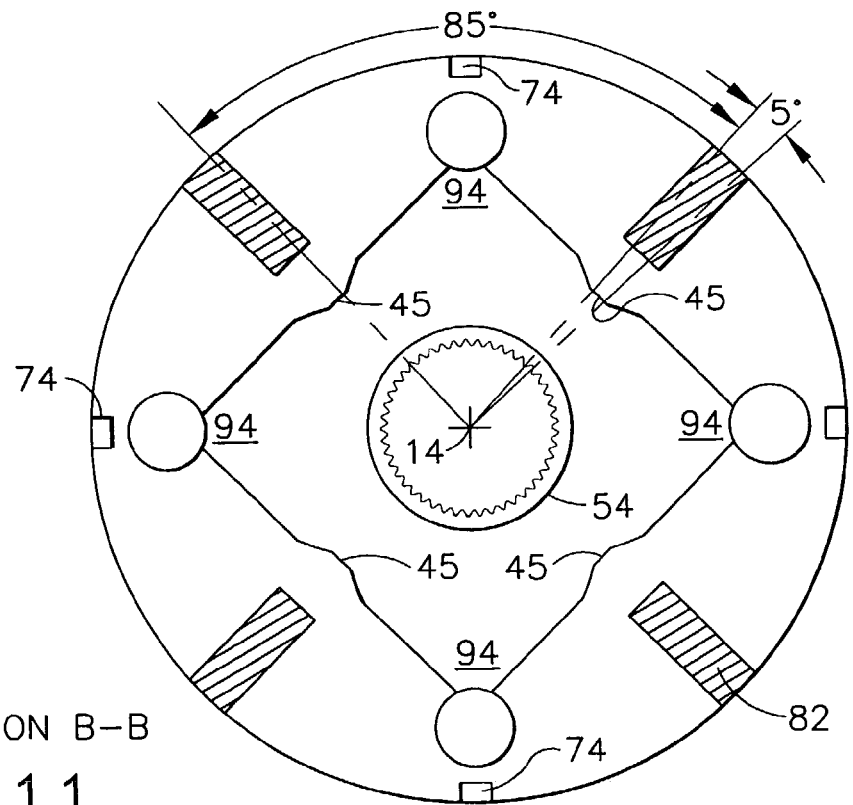
FIG. 11 is a Section B-B of FIG. 7 having a carrier side oil inlet cavity of an alternative shape.

FIG. 11 is a Section B-B of FIG. 7 having carrier side inlet cavities 70 of an alternative shape 94 which are also formed by straight lines forming funnels toward washer oil inlet ports.

Figure 12:
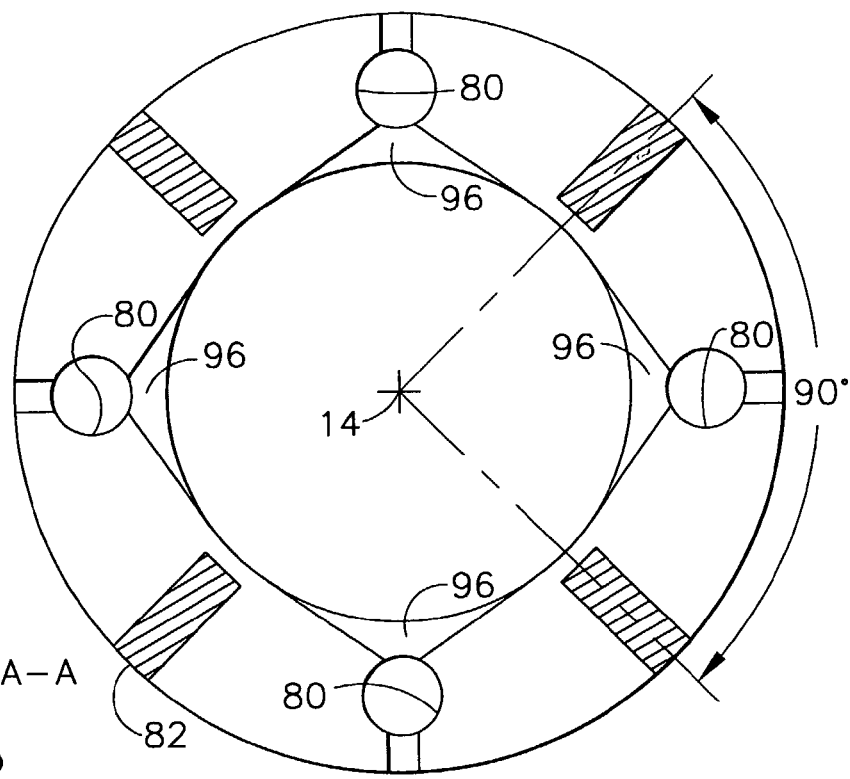
FIG. 12 is a Section A-A of FIG. 7 having a housing side oil inlet cavity of another alternative shape.

FIG. 12 is a Section A-A of FIG. 7 having a shaped housing side inlet cavities 62 of another alternative triangular shape 96.

Figure 13:
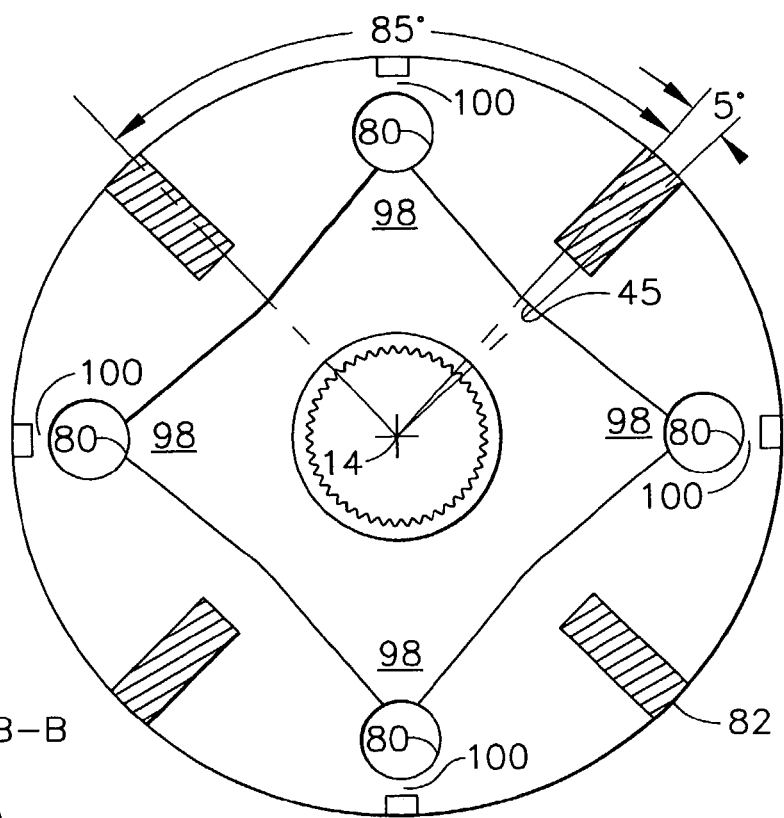
FIG. 13 is a Section B-B of FIG. 7 having a carrier side oil inlet cavity of another alternative shape.

FIG. 13 is a Section B-B of FIG. 7 having carrier side inlet cavities of another alternative shape 98 that taken together substantially form a substantially square outline or shape. Feature 100 show the portion of carrier 16 that block oil even though washers 30 have outlet scallop 36. Alternatively outlet scallops 36 could perhaps be removed from washers 30 used on carrier flange 78 in some applications.

Thus, the above-described embodiments facilitate reduction in the costs associated with increasing the lube flow to a planet gear roller bearings 20 through the use of cast features. Such cast features are employed in conjunction with other already used components such as face washers having strategically placed inexpensive features or scallops in place of machined features. Such embodiments enable an increase in the speed rating of planet gear roller bearings 20 by increasing the cooling that results from increasing the volume of oil through bearings 20.

While the preferred exemplary embodiments have been presented in the foregoing detailed description, it should be appreciated that a vast number of variations exist. It should also be appreciated that these preferred exemplary embodiments are only examples, and are not intended to limit the scope, applicability, or configuration of the invention in any way. Rather, the foregoing detailed description will provide those skilled in the art with a convenient road map for implementing a preferred embodiment of the invention. It is understood that various changes may be made in the function and arrangement of elements described in an exemplary preferred embodiment without departing from the spirit and scope of the invention as set forth in the appended claims.

The invention claimed is:

1. A planetary gear train assembly comprising:
   a plurality of thrust bearings each configured to receive a lubricant and to purge the lubricant radially outward;
   a sun gear coupled to an input shaft and contained axially by the plurality of thrust bearings;
   a plurality of planet gears each configured to mesh with the sun gear and to rotate about a central pin via a plurality of planet bearings; and
   a carrier supporting the plurality of planet gears between a first side and a second side of the carrier, each of the first and second sides of the carrier having a monolithic inner surface facing the plurality of planet gears, wherein each of the first and second sides of the carrier comprises a plurality of oil dispersion cavities in the monolithic inner surface facing toward the plurality of planet gears, each of the oil dispersion cavities extending in the monolithic inner surface outwardly from at least one of the plurality of thrust bearings to at least one of the planet bearings to thereby channel lubricant from the thrust bearings to the planet bearings and wherein at least one of the first and second sides comprises a plurality of oil outlet cavities extending in the monolithic inner surface from at least one of the planet bearings to an outboard side of the carrier, wherein the oil outlet cavities are configured to channel lubricant from the planet bearings to the outboard side of the carrier.

2. The planetary gear train assembly of claim 1 wherein the monolithic inner surfaces of each of the first and second sides are substantially planar.

3. The planetary gear train assembly of claim 2 wherein the oil dispersion cavities are concave recesses in the substantially planar monolithic inner surfaces.

4. The planetary gear train assembly of claim 1 wherein the oil dispersion cavities are cast features in the first and second sides of the carrier.

5. The planetary gear train assembly of claim 1 further comprising a plurality of washers each located between one of the planet gears and the carrier along the central pin of the planet gear, wherein each of the washers comprises an inlet scallop located proximate one of the oil dispersion cavities, and wherein at least a portion of the plurality of washers comprise an outlet scallop located proximate one of the plurality of oil outlet cavities.

6. The lubrication system of claim 1, wherein the first and second sides of the carrier are connected by cross members.

7. The lubrication system of claim 6, wherein the first and second sides of the carrier each includes pilots for the thrust bearings, and wherein the pilots are aligned with the cross members.

8. A planetary gear train assembly that cooperates with a shaft, the planetary gear train comprising:
   a sun gear coupled to the shaft and contained axially by a first thrust bearing proximate a first side of the sun gear and a second thrust bearing proximate an opposing second side of the sun gear;
   a plurality of planet gears each configured to mesh with the sun gear and to rotate about a central pin via a set of planet bearings;
   a first carrier side having a first substantially planar inner surface that faces toward the first side of the sun gear, wherein the first carrier side comprises, for each of the planet gears, a first carrier side inlet cavity in the first substantially planar inner surface that extends from the first thrust bearing to the set of planet bearings associated with the planet gear;
   a second carrier side having a second substantially planar inner surface that faces toward the second side of the sun gear, wherein the second carrier side comprises, for each of the planet gears, a second carrier side inlet cavity in the second substantially planar inner surface that extends from the second thrust bearing to the set of planet bearings associated with the planet gear; and
   a plurality of cross-members holding the first carrier side and the second carrier side together.

9. The planetary gear assembly of claim 8 wherein the first and second carrier side inlet cavities channel lubricant from the first and second thrust bearings, respectively, to the planet bearings.

10. The planetary gear assembly of claim 8 wherein the first carrier side comprises a plurality of oil outlet cavities each extending from one of the sets of planet bearings to an outboard side of the first carrier side.

11. The planetary gear assembly of claim 10 wherein the first and second carrier side inlet cavities channel lubricant from the first and second thrust bearings, respectively, to the planet bearings and wherein the oil outlet cavities channel the lubricant from the planet bearings to the outboard side of the carrier.

12. The planetary gear train assembly of claim 10 further comprising a plurality of washers each located between one of the planet gears and one of the first and second carrier sides along the central pin of the planet gear, wherein each of the washers comprises an inlet scallop located proximate one of the carrier side inlet cavities, and wherein at least a portion of the plurality of washers comprise an outlet scallop located proximate one of the plurality of oil outlet cavities.

13. The planetary gear assembly of claim 8 wherein the first and second thrust bearings receive the lubricant from the shaft.

14. The planetary gear assembly of claim 8 wherein the first and second carrier side inlet cavities are crescent shaped.

15. The planetary gear assembly of claim 8 wherein the first and second carrier side inlet cavities are triangular in shape.

16. The planetary gear assembly of claim 8 wherein the first and second carrier side inlet cavities are substantially semi-circular in shape.

17. The planetary gear train assembly of claim 8 wherein the first and second carrier sides are monolithic.

18. The planetary gear train assembly of claim 8 wherein the first and second carrier side inlet cavities are concave recesses in the first and second substantially planar inner surfaces.

19. The planetary gear train assembly of claim 8 wherein the first and second carrier side inlet cavities are cast features in the first and second carrier sides.

* * * * *